United States Patent [19]

Godoy et al.

[11] Patent Number: 5,153,233

[45] Date of Patent: Oct. 6, 1992

[54] STABILIZATION OF MELAMINE AND/OR UREA DISPERSIONS IN POLYOLS AND POLYMER POLYOLS

[76] Inventors: Jose Godoy, 5 Contrat Social, CH-1203 Geneva; Jitka Jenc, 6 Nant de Creve-Coeur, CH-1250 Versoix, both of Switzerland; Werner A. Lidy, Jan van Galenstraat 20, 4535 BX Terneuzen, Netherlands

[21] Appl. No.: 684,949

[22] PCT Filed: Nov. 14, 1989

[86] PCT No.: PCT/GB89/01347

§ 371 Date: Jul. 15, 1991

§ 102(e) Date: Jul. 15, 1991

[87] PCT Pub. No.: WO90/05760

PCT Pub. Date: May 31, 1990

[30] Foreign Application Priority Data

Nov. 15, 1988 [GB] United Kingdom ............... 8826727

[51] Int. Cl.$^5$ .............................................. C08G 18/28

[52] U.S. Cl. ................................. 521/121; 521/136; 528/52; 528/53; 528/54; 252/182.24; 524/161; 524/386; 524/597

[58] Field of Search ............... 521/121, 136; 528/52, 528/53, 54; 252/182.24; 524/161, 386, 597

[56] References Cited

U.S. PATENT DOCUMENTS 4,293,657 10/1981 Nissen et al. .................. 521/166
4,454,254  6/1984 Reichel et al. ................ 521/136

OTHER PUBLICATIONS

Allinger, et al; *Organic Chemistry;* p. 938; 1985.

Primary Examiner—Maurice J. Welsh
Assistant Examiner—Rachel Johnson

[57] ABSTRACT

A storage stable or easily redispersible dispersion of melamine, urea or a blend thereof in a polyol, polymer polyol or a blend thereof is produced by the addition of an alkylbenzenesulfonate salt to the dispersion. Foams, polyurethane foams and other polyurethane materials made from storage stable or easily redispersible dispersion of the present invention show improved combustion resistance properties.

10 Claims, No Drawings

STABILIZATION OF MELAMINE AND/OR UREA DISPERSIONS IN POLYOLS AND POLYMER POLYOLS

The present invention relates to the preparation of storage stable or easily redispersable melamine and/or urea dispersions in polyols, polymer polyols and blends thereof for use in the manufacture of combustion resistant polyurethane foams.

The combustibility of polyurethane foam is a well known phenomenon which now limits its use in some applications. In furniture application, the United Kingdom has adopted legislation which requires polyurethane foam to meet more rigorous combustibility standards. Most presently available foams cannot meet these standards. Consequently, there is a need for modified polyurethane foams which are less combustible than previously.

An approach to solve this problem was developed by Bridgestone (see for example GB Patent No. 1,585,750) and BASF (see for example U.S. Pat. No. 4,258,141) in the late seventies. Their solution to this problem was to incorporate melamine into the polyurethane foam during its manufacture.

The most convenient way of introducing melamine into the formulation was to first disperse it into the polyol. At this stage the melamine/polyol dispersion has to be stirred continuously or the foam manufactured immediately since melamine settles rapidly out of a polyol dispersion. Thereafter it is extremely difficult to redisperse it again. This problem was addressed by BASF in U.S. Pat. No. 4,293,657 for conventional polyether polyols. U.S. Pat. No. 4,293,657 discloses the use of a stabilizer in conjunction with very fine particle size melamine. The stabilizer used is selected from silicic acid and silicates, perfluorinated alkyl carboxylic acids and salts, fatty alcohol sulfate salts, etc. This patent teaches that 90% of the melamine should have a particle size less than 10 microns.

The approach described above has disadvantages. If done in situ, as tought in U.S. Pat. No. 4,293,657, the melamine particle size reduction is a costly, energy intensive process during which polyol degradation may occur. If not done in situ, the very fine particle sized melamine grades (90% less than 10 micron) produce inherently more stable dispersions but they are more difficult to handle and to disperse than the most common grades with an average particle size of about 50 microns. In addition, for the same melamine loading, the dispersion viscosity increases rapidly with particle size reduction.

Surprisingly, it has now been found that the presence of alkylbenzene sulphonate salts improves considerably the stability of melamine and/or urea dispersions in polyols and polymer polyols. Surprisingly it has also found also that the initial presence of alkylbenzenesulphonate salts in a dispersion allows an easy redispersion of the melamine or urea if it has settled out.

Accordingly, the present invention concerns a storage stable or easily redispersible dispersion of melamine, urea or a blend thereof in a polyol, polymer polyol or a blend thereof characterized in that the said dispersion comprises an alkylbenzenesulfonate salt as a dispersion stabilizer.

In another aspect the present invention concerns a method for preparing a storage stable or easily redispersible dispersion of melamine, urea or a blend thereof in a polyol, polymer polyol or a blend thereof wherein a dispersion stabilizer is added prior to, during or shortly after the addition of melamine, urea or a blend thereof to the polyol, polymer polyol or a blend thereof, characterized in that said dispersion stabilizer is an alkylbenzenesulfonate salt.

Still in another aspect the present invention concerns a foam produced from the storage stable or easily redispersible dispersion of melamine, urea or a blend thereof of the present invention.

Still in another aspect the present invention concerns polyurethane foams produced from the storage stable or easily redispersible dispersion of melamine, urea or a blend thereof of the present invention.

Still in another aspect the present invention concerns an aricle made from the polyurethane foam produced from the storage stable or easily redispersible dispersion of melamine, urea or a blend thereof of the present invention.

Still in another aspect the present invention concerns a polyurethane material produced from the storage stable or easily redispersible dispersion of melamine, urea or a blend thereof of the present invention and an article made of such a polyurethane material.

The polyols are well known to the skilled man. Examples of such polyols are found in GB Patent No. 1,482,213 and U.S. Pat. Nos. 3,461,086; 3,535,307; 3,336,242 and 3,738,953.

The polymer polyols may either be a dispersion polymer polyol, a grafted copolymer polyol, a solution polymer polyol or a blend of these. In the case of dispersion polymer polyols, the present invention is particularly applicable to dispersions of polyureas of polyhydrazocarbonamides in polyether polyols, polytetrahydrofurane polyols, polyester polyols and polylactone polyols. Most preferred are either those materials of the type described in GB Patent 1,501,172 (known in the art as PHD polymer polyols) or those described in U.S. Pat. No. 4,374,209 (know in the art as PIPA dispersion polymer polyols). PHD polymer polyols are prepared by reacting (a) a polyamine, hydrazine or hydrazide with (b) a di- or polyfunctional isocyanate in a basestock polyol whilst PIPA disperion polymer polyols are prepared by reacting on olamine e.g. an alkanolamine, with a di- or polyfunctional isocyanate in a basestock polyol. Also suitable are dispersion polymer polyols of the type described in U.S. Pat. No. 4,789,690 prepared by reacting an epoxy resin with an epoxy hardener in the presence of a liquid basestock polyol.

As an alternative to dispersion polymer polyols, it is possible to use grafted copolymer polyols. Typical grafted copolymer polyols have been described at length in U.S. Pat. No. 3,304,273, U.S. Pat. No. 3,583,351 and U.S. Pat. No. 4,789,690. The most commonly used are those in which a styrene/acrylonitrile (SAN) copolymer graft is employed. Typically such grafted copolymer polyols contain between 1 and 45% polymer by weight.

The melamine, urea or melamine/urea blend particles dispersed in the polyol or polymer polyol are preferably in a form such that more than 90% have a particle size in excess of 10 microns. Preferably the melamine, urea or melamine/urea blend comprises between 1 and 50% by weight of the dispersion.

The alkylbenzenesulphonate salt is suitably one having surfactant properties i.e. alkyl group has preferably between 10 and 25 carbon atoms. One or more alkyl or sulphonate groups can be present. Both the hydrogens of the alkyl group(s) and the hydrogens of the benzene ring can be substituted partially or totally with non reactive substitutents such as halogen. It is preferably to employ an alkali metal salt of the alkylbenzene sulphonate, most preferred either the sodium or potassium salt. The most preferred alkylbenzenesulphonates are sodium and potassium dodecylbenzenesulphonate. Preferably the alkylbenzenesulphonate salt comprises between 0.01 and 10% by weight of the dispersion. The alkylbenzenesulphonate salt can be used as such or in solution, preferably an aqueous solution.

The dispersion of the present invention is conveniently prepared by adding the alkylbenzenesulphonate to a stirred blend of the melamine, urea or melamine/urea blend in the polyol or polymer polyol. However it is not essential that such a procedure be followed and the alkylbenzenesulphonate salt can also be added with the melamine or urea or even beforehand if convenient.

The stability of melamine, urea or melamine/urea blend dispersions in polyols can easily be assessed visually. For opaque polymer polyols, a visual assessment is more difficult. The viscosity of a dispersion is also a measure of its filler (melamine, urea, ...) content. The settling process can conveniently be followed in time, without disturbing the settling process itself, by measuring the cone and plate viscosity of a droplet taken at the surface of the dispersion. When complete filler sedimentation occurs, the measured viscosity is, respectively, the polyol or polymer polyol viscosity.

The dispersions of the present invention are used primarily in the manufacture of polyurethane foam. Flexible polyurethane foam formulation are prepared by mixing a dispersion of the present invention with a di-or polyisocyanate, catalyst(s) and blowing agent(s) optionally in the presence of further polyols of polymer polyols and other additives well known to the skilled man.

For the purpose of preparing the formulation any di- or polyfunctional aliphatic, cycloaliphatic or aromatic isocyanate defined above can be used, although preference is given to isomers of toluene diisocyanate or di(4-isocyanatophenyl)methane, its isomers and oligomers. As regards the blowing agent(s), i.e. water, halocarbons, permanent gase(s) etc. and catalyst(s) i.e. amine and/or tin catalyst etc, these will also be familiar to the skilled man. To optimise the required load of melamine, urea or melamine/urea blend, flame retardants are commonly used i.e. phosphorus, halogen, etc containing compounds.

In addition to the above components, other additives i.e. surfactants, fillers, pigments, etc may also be added.

After these ingredients are mixed, the formulation is allowed to foam and cure in the normal way.

The invention will now be illustrated but by no means limited by the following examples.

EXAMPLE 1

A dispersion of melamine in polyol was prepared by stirring together (2000 rpm, marine type impeller) 800 g of POLYURAX POLYOL U-10.02 (supplied by BP Chemicals Limited) and 200 g melamine (DG-002 as supplied by DSM). To the stirred mixture was then added 8 g of a 40% by weight aqueous solution of sodium dodecylbenzenesulphonate. Stirring was continued for a further 5 minutes after which the dispersion was left to stand. It was examined visually. The dispersion appeared homogeneous for at least a 2 weeks period. The Cone and Plate viscosity of the surface layer was measured versus time (see Table 1).

COMPARATIVE EXAMPLE 1

Example 1 was repeated except that the addition of the sodium dodecylbenzenesulphonate solution was omitted. The melamine was already sedimented after 3 hours. The top layer viscosity versus time is given in Table 1. After 59 hours standing, its viscosity dropped to the original Polyurax Polyol U-10.02 value.

EXAMPLE 2

Procedure of Example 1 was repeated except that 4 g of the 40% by weight aqueous solution of sodium dodecylbenzenesulfonate was added. After 2 days standing, a sediment layer was formed. This sediment layer was easily redispersed with a spatula.

COMPARATIVE EXAMPLE 2

Procedure of Example 1 was repeated except that the addition of sodium dodecylbenzenesulfonate was omitted. After 2 days standing, a sediment layer was formed. This sediment layer could not be redispersed with a spatula.

EXAMPLE 3

Three main types of polymer polyol were prepared at the same solids level.

A PIPA type polymer polyol was prepared at 15% solids by reacting TDI (toluenediisocyanate) with TEOA (triethanolamine) in Polyurax Polyol U-10.02 in the presence of a dibutyltindilaurate catalyst.

A PHD type polymer polyol (DESMOPHEN 3119 as supplied by Bayer) was diluted to 15% solids with Polyurax Polyol U-10.02.

A SAN copolymer polyol (POLYURAX POLYOL U-14.06 supplied by BP Chemicals Limited) was diluted with Polyurax Polyol U-10.02 to 15% soldis.

Example 1 and Comparative Example 1 were then repeated with the 3 polymer polyols mentioned above. The viscosities in function of time are also given in Table 1. When the viscosity reading went out of scale at 50° C., the measurement was also made at 100° C.

EXAMPLE 4

The following formulation was prepared and allowed to foam and cure:

|  | php |
| --- | --- |
| Dispersion of Example 1 or Comparative Example 1 (*) | 100 |
| Diethanolamine (DEOA) | 1 |
| POLYURAX Silicone Surfactant SH-209 (**) | 1 |
| NIAX Catalyst A-1 (***) | 0.15 |
| Dibutyl Tin Dilaurate | 0.25 |
| TDI Index | 110 |

(*) The freshly prepared and 2 days aged dispersion of Example 1 and the freshly prepared dispersion from Comparative Example 1
(**) Trademarks of BP Chemicals Ltd
(***) Trademark of Union Carbide Corporation The 3 bench prepared foams of each polymer polyol type i.e. with and without sodium dodecylbenzenesulphonate, showed similar rise profile, settle, foam aspect and cell structure.

EXAMPLE 5

The following formulations were prepared and allowed to foam and cure:

|  | php |
|---|---|
| Dispersions of Example 3 (*) | 100 |
| Water (total) | 3.1 |
| DEOA | 1.4 |
| POLYURAX Silicone Surfactant SH-209 (**) | 0.5 |
| NIAX Catalyst A-1 | 0.06 |
| DABCO 33LV (**) | 0.10 |
| Stannous octoate | 0.2 |
| FREON F-11 (***) | 5.0 |
| THERMOLIN 101 (****) | 5.0 |

(*) The freshly prepared and 2 days aged dispersions containing the sodium dodecylbenzenesulphonate of Example 3 and the freshly prepared dispersion without sodium dodecylbenzenesulphonate of Example 3.
(**) Trademark of AIR PRODUCTS
(***) Trademark of DUPONT
(****) Trademark of OLIN All comparative bench prepared foams, based on the same polymer polyol with and without sodium dodecylbenzenesulphonate, again showed similar rise profiles, settle, foam aspect and cell structure.

TABLE 1

MEASUREMENT OF THE STABILITY OF MELAMINE DISPERSIONS BY VISCOSITY
(VISCOSITY MEASURED AT 50 OR 100° C. WITH A CONE AND PLATE VISCOMETER)

| POLYMER TYPE | NA | | | PHD | | | | PIPA | | | SAN COPOLYMER | | | |
|---|---|---|---|---|---|---|---|---|---|---|---|---|---|---|
| SOLID % | 0 | | | 15 | | | | 15 | | | 15 | | | |
| POLYOL TYPE | BASE POLYOL | | | POLYMER POLYOL | | | | POLYMER POLYOL | | | POLYMER POLYOL | | | |
| TRADE NAME | POLYURAX U-10.02 | | | DESMOPHEN 3119 | | | | NA | | | POLYURAX U-14.06 | | | |
| php | 100 | 100 | 100 | 100 | 100 | 100 | 100 | 100 | 100 | 100 | 100 | 100 | 100 | 100 |
| Na DBS php | 0 | 0 | 1 | 0 | 0 | 1 | 1 | 0 | 1 | 1 | 0 | 0 | 1 | 2 | 2 |
| MELAMINE TYPE | DS 002 | | | DG 002 | | | | DG 002 | | | DG 002 | | | |
| php | 0 | 33 | 33 | 0 | 33 | 33 | 33 | 33 | 33 | 33 | 0 | 33 | 33 | 33 | 33 |
| TEMPERATURE (°C.) | 50 | 50 | 50 | 50 | 50 | 50 | 100 | 50 | 50 | 100 | 50 | 50 | 50 | 50 | 100 |
| TIME (HOURS) | VISCOSITY (POISE) | | | VISCOSITY (POISE) | | | | VISCOSITY (POISE) | | | VISCOSITY (POISE) | | | |
| 0 | 13 | 21 | 27 | 26 | 33 | >40 | 10 | 34 | >40 | 14 | 23 | 33 | 36 | 39 | 10 |
| 1 | | 19 | 28 | | 35 | >40 | | 32 | >40 | 14 | | 27 | 37 | | |
| 2 | | 16 | 26 | | 29 | >40 | | 34 | >40 | | | 25 | 36 | | |
| 3 | | 15 | 26 | | 31 | >40 | | 34 | >40 | | | 25 | 36 | | |
| 5 | | 14 | 26 | | 30 | >40 | | 32 | >40 | | | 25 | 37 | | |
| 24 | | 14 | 27 | | 26 | >40 | | 31 | >40 | | | 23 | 36 | | |
| 72 | | 13 | 26 | | 25 | >40 | | 29 | >40 | | | 22 | 26 | | |
| 156 | | 13 | 25 | | 26 | >40 | 10 | 29 | >40 | 14 | | 22 | 22 | 39 | 10 |

REMARKS
NA = NOT APPLICABLE
Na DBS = 40% BY WEIGHT OF AN AQUEOUS SOLUTION OF SODIUM DODECYLBENZENESULPHONATE

We claim:

1. A storage stable or easily redispersible dispersion of melamine, urea or a blend thereof in a polyol, polymer polyol or a blend thereof wherein said dispersion comprises an alkylbenzenesulfonate salt as a dispersion stabilizer and wherein more than 90% by weight of the dispersed melamine, urea or blend thereof has a particle size in excess of 10 microns.

2. A storage stable or easily redispersible dispersion as claimed in claim 1, characterised in that the alkyl group of the alkylbenzenesulfonate salt contains more than one carbon atom.

3. A storage stable or easily redispersible dispersion as claimed in claim 1, characterised in that the alkylbenzenesulfonate salt is sodium or potassium dodecylbenzenesulfonate.

4. A storage stable or easily redispersible dispersion as claimed in claim 1, characterised in that the alkylbenzenesulfonate salt comprises from 0.01% by weight to 10% by weight of the dispersion.

5. A storage stable or easily redispersible dispersion as claimed in claim 1, characterised in that the melamine, urea or blend thereof comprises between 1% by weight and 50% by weight of the dispersion.

6. A method of preparing a storage stable or easily redispersible dispersion of melamine, urea or a blend thereof in a polyol, polymer polyol or a blend thereof wherein a dispersion stabilizer is added prior to, during, or shortly after the addition of melamine, urea or blend thereof to the polyol, polymer polyol or blend thereof wherein said dispersion stabilizer is an alkylbenzenesulfonate salt and wherein more than 90% by weight of the dispersed melamine, urea or blend thereof has a particle size in excess of 10 microns.

7. A foam produced from a storage stable or easily redispersible dispersion as claimed in claim 1.

8. A polyurethane foam produced from a storage stable or easily redispersible dispersion as claimed in claim 1.

9. An article made of a polyurethane foam as claimed in claim 8.

10. A polyurethane material made from a storage stable or easily redispersible dispersion as claimed in claim 1.

* * * * *